United States Patent [19]

Niikura

[11] Patent Number: 4,725,951
[45] Date of Patent: Feb. 16, 1988

[54] CONTROL SYSTEM FOR LOCK-UP CLUTCH IN TORQUE CONVERTER

[75] Inventor: Yasuhiro Niikura, Yokosuka, Japan

[73] Assignee: Nissan Motor Co., Ltd., Yokohama, Japan

[21] Appl. No.: 687,291

[22] Filed: Dec. 28, 1984

[30] Foreign Application Priority Data

Dec. 29, 1983 [JP] Japan .................................. 58-251157
Dec. 29, 1983 [JP] Japan .................................. 58-251160

[51] Int. Cl.⁴ .............................................. B60K 41/08
[52] U.S. Cl. .................................... 364/424.1; 364/161;
192/3.31; 74/866
[58] Field of Search ...................... 364/161, 162, 424.1;
74/866; 192/3.31

[56] References Cited

U.S. PATENT DOCUMENTS

| 3,495,074 | 2/1970 | Jacques | 364/161 X |
| 4,027,554 | 7/1977 | Ito et al. | 74/866 |
| 4,277,945 | 7/1981 | Esthimer et al. | 364/161 X |
| 4,393,467 | 7/1983 | Miki et al. | 364/424.1 |
| 4,457,410 | 7/1984 | Suga et al. | 192/3.31 |
| 4,495,576 | 1/1985 | Ito | 364/424.1 |
| 4,560,043 | 12/1985 | Murasugi et al. | 192/3.31 |
| 4,577,737 | 3/1986 | Niikura et al. | 192/3.31 |

OTHER PUBLICATIONS

Diligenskii: Certain Block Diagrams and Dynamic Characteristics for Digital Controllers Translated from Automatica i Telemekhauika, vol. 23, No. 11, pp. 1364–1375, Nov. 1962.

Primary Examiner—Parshotam S. Lall
Attorney, Agent, or Firm—Schwartz, Jeffery, Schwaab, Mack, Blumenthal & Evans

[57] ABSTRACT

A control system for a lock-up clutch in a torque converter wherein a lock-up clutch is controlled in response to load on a power source drivingly connected to an input element of the torque converter. A throttle opening degree and a revolution speed of an output element are used to determine load on the power source. In response to the load on the power source, a control gain is altered and the lock-up clutch is controlled in accordance with this altered control gain.

8 Claims, 21 Drawing Figures

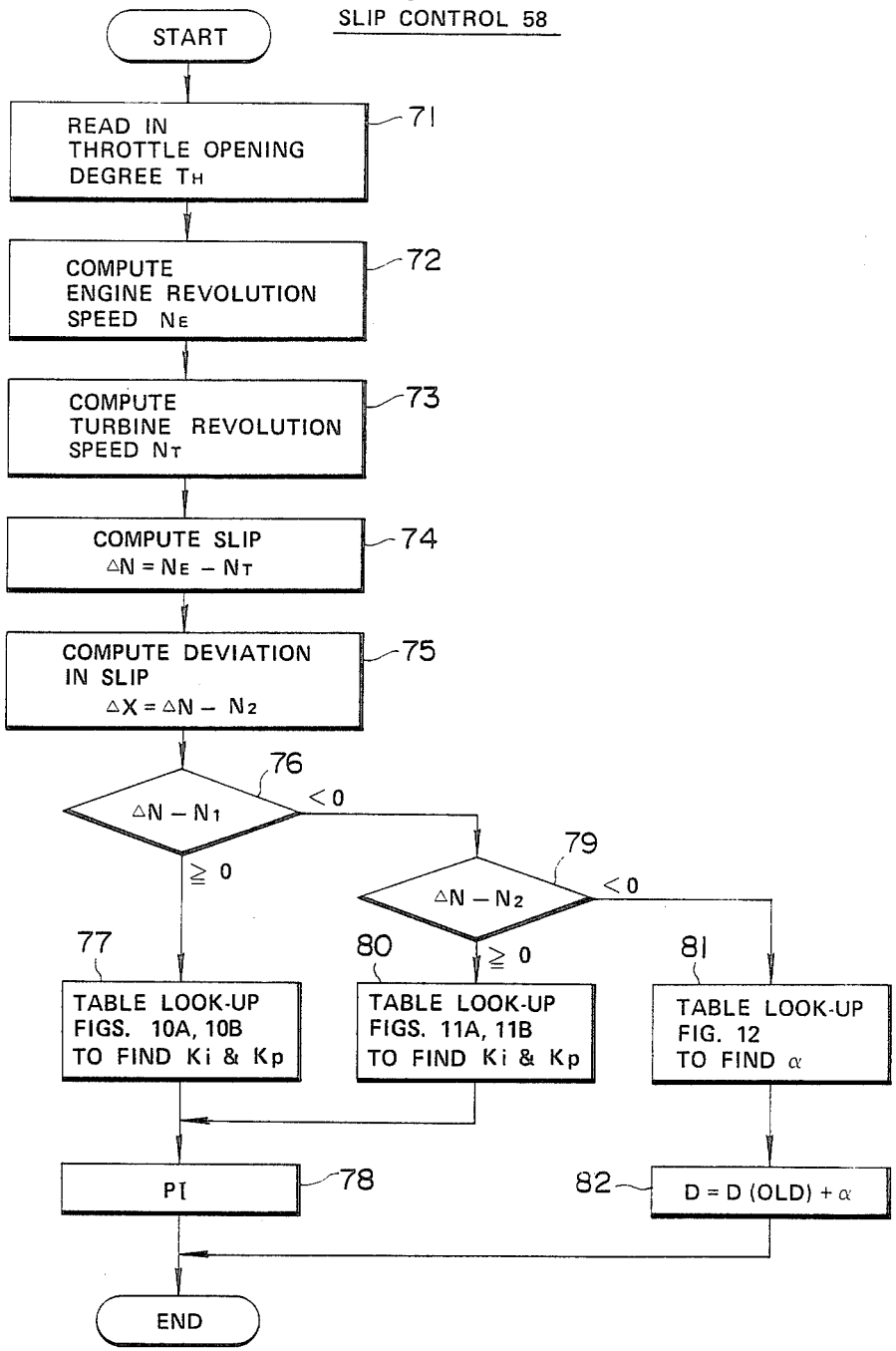

FIG.10A

TABLE I (Ki)

| | | | | | | |
|---|---|---|---|---|---|---|
| $Kim_1$ | --- | --- | --- | --- | --- | $Kim_\ell$ |
| | | | | | | |
| | | | | | | |
| $Ki_{21}$ | | | | | | |
| $Ki_{11}$ | $Ki_{12}$ | --- | --- | --- | --- | $Ki_{1\ell}$ |

TABLE I (Kp)

| | | | | | | |
|---|---|---|---|---|---|---|
| $Kpm_1$ | --- | --- | --- | --- | --- | $Kpm_\ell$ |
| | | | | | | |
| | | | | | | |
| $Kp_{21}$ | | | | | | |
| $Kp_{11}$ | $Kp_{12}$ | --- | --- | --- | --- | $Kp_{1\ell}$ |

TABLE II (Ki)

| $K_{im1}$ | ---- | ---- | ---- | ---- | ---- | $K_{iml}$ |
|---|---|---|---|---|---|---|
| | | | | | | |
| | | | | | | |
| $K_{i21}$ | | | | | | |
| $K_{i11}$ | $K_{i12}$ | ---- | ---- | ---- | ---- | $K_{i1l}$ |

TABLE II (Kp)

| $K_{pm1}$ | ---- | ---- | ---- | ---- | ---- | $K_{pml}$ |
|---|---|---|---|---|---|---|
| | | | | | | |
| | | | | | | |
| $K_{p21}$ | | | | | | |
| $K_{p11}$ | $K_{p12}$ | ---- | ---- | ---- | ---- | $K_{p1l}$ |

$T_H$ ↑   $N_T$ →

TABLE III (alpha)

TABLE IV (Ki)

| | | | | | | |
|---|---|---|---|---|---|---|
| Kim₁ | --- | --- | --- | --- | --- | Kimℓ |
| | | | | | | |
| | | | | | | |
| Ki₂₁ | | | | | | |
| Ki₁₁ | Ki₁₂ | --- | --- | --- | --- | Ki₁ℓ |

$T_H$ ↑ , $N_T$ →

TABLE IV (Kp)

| | | | | | | |
|---|---|---|---|---|---|---|
| Kpm₁ | --- | --- | --- | --- | --- | Kpmℓ |
| | | | | | | |
| | | | | | | |
| Kp₂₁ | | | | | | |
| Kp₁₁ | Kp₁₂ | --- | --- | --- | --- | Kp₁ℓ |

$T_H$ ↑ , $N_T$ →

SLIP IN T.C. ↑, ΔNr, TIME →

CONTROL SYSTEM FOR LOCK-UP CLUTCH IN TORQUE CONVERTER

BACKGROUND OF THE INVENTION

The present invention relates to a control system for a lock-up clutch in a torque converter.

Usually, torque conveters are poor in power transmission efficiency owing to a slip between an input element and an output element because the power transmission is carried out such that a working fluid moved by the input element, such as a pump impeller, moves the output element, such as a turbine runner although a torque multiplication and a torque variation absorption are available.

Thus, a so-called lock-up type torque converter has been put into practice wherein an output element is mechanically connected to the input element during an operating condition of a power source where a torque multiplication and a torque variation absorption are not needed to eliminate a slip mentioned above for increased power transmitting effeciency. In the lock-up type torque converter, a lock-up control is carried out such that during an operating condition of the power source where the torque multiplication and torque variation absorption are needed, a lock-up clutch is released to render the torque converter to operate in a converter state (a converter range), whereas during an operating condition where the above mentioned functions are not needed, the lock-up clutch is engaged to render the torque converter to operate in a lock-up state (a lock-up range). In addition to this basic control strategy, the lock-up clutch is released when the power source is idling or when the transmission is in neutral even if an operation in lock-up range is demanded. Thus, the lock-up control is such that the torque converter frequently switches between the torque converter state and the lock-up state.

The lock-up clutch is operable in response to a difference between a lock-up pressure to which one side thereof is exposed and a converter pressure to which an opposite side thereof is exposed such that the lock-up clutch is released when the lock-up pressure is substantially equal to the converter pressure and is engaged when the lock-up pressure is discharged.

The lock-up torque converter of the above mentioned type poses a problem that substantial shocks are produced when the lock-up clutch is engaged if rate of engagement of the lock-up clutch is very high. The result is that the rate of reduction of the lock-up pressure which is to take place upon shifting from the converter state to the lock-up state is very quick. In order to alleviate this problem, it has been the common practice to provide an orifice so as to effect gradual reduction of the lock-up pressure. However, the provision of the orifice is not satisfactory in eliminating the substantial shocks.

Another control strategy of a lock-up clutch of a torque converter is such that during an operating condition of a power source where torque multiplication is not needed although there is a torque variation, a slip control is carried out such that a relative rotation between an input element and an output element is adjusted to a required minimum limit (a preset value) in order to enhance a power transmission effeciency while securing a slip in the torque converter necessary to absorb a torque variation.

The slip control thus far proposed, however, has not been satisfactory.

SUMMARY OF THE INVENTION

According to the present invention, there is provided a control system for a lock-up clutch in a torque converter wherein a control gain is altered in response to a load on a power source so that the lock-up clutch is controlled in accordance with the control gain which is altered with variations in load on the power source.

An object of the present invention is to provide a control system which provides a satisfactory control of a lock-up clutch in a torque converter which is not affected by variations in load on a power source.

According to one aspect of the present invention, a control gain is altered in response to a load on a power source and engagement speed of a lock-up clutch is controlled in accordance with the control gain variable with the load on the power source so as to provide shockless engagement of the lock-up clutch.

According to another aspect of the present invention, a lock-up clutch is controlled in accordance with a control gain which is altered in response to a load on a power source so as to allow a slip in a torque converter to adjust quickly to a preset value even if the load on the power source varies.

BRIEF DESCRIPTION OF THE DRAWINGS

FIG. 9 is a flowchart of a slip control program;

FIGS. 10A and 10B show a TABLE I for Ki and a TABLE I for Kp, respectively;

FIGS. 11A and 11B show a TABLE II for Ki and a TABLE II for Kp, respectively;

DESCRIPTION OF THE PREFERRED EMBODIMENTS

Figure 2:
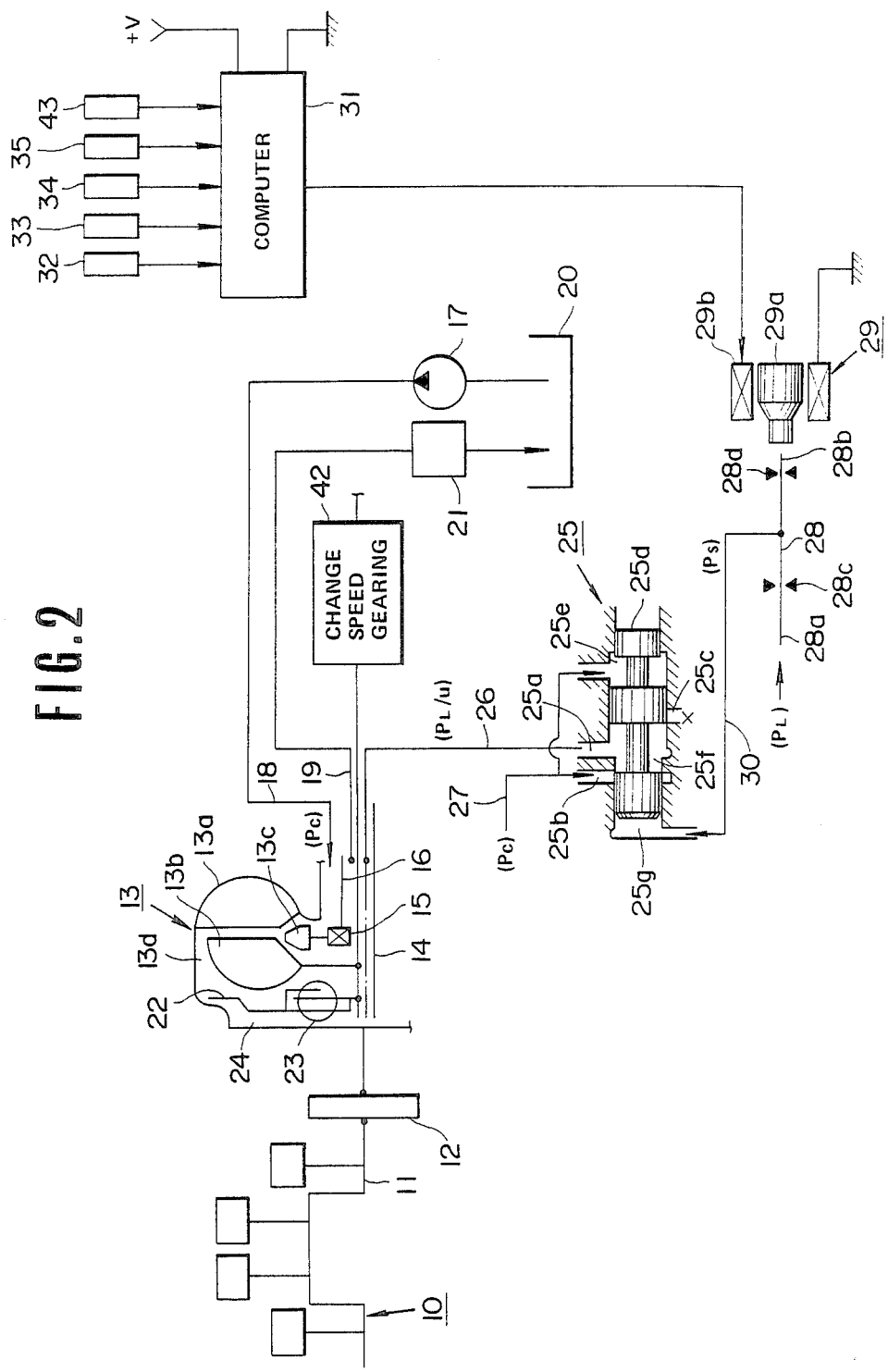
FIG. 2 is a schematic view of a control system for a lock-up clutch in a torque converter.

Referring to FIG. 2, a first embodiment of a control system for a lock-up clutch in a torque converter according to the present invention is described.

FIG. 2 shows an automotive power train including an engine 10, as a power source, having a crankshaft 11 and a flywheel 12 which is drivingly connected to a torque converter 13 having a torque converter output shaft 14. When it is in operation, the engine 10 turns the crankshaft 11 together with the flywheel 12. The torque converter 13 comprises a pump impeller (an input element) 13a drivingly connected to the crankshaft 11 to be always driven thereby, a turbine runner (an output element) 13b and a stator (a reaction element) 13c. The turbine runner 13b is drivingly connected to the output shaft 14, and the stator 13c is mounted around a stationary sleeve shaft 16 via a one-way clutch 15. Operating fluid is supplied from a pump 17 to an inside torque converter chamber 13d via a fed passage 18. The operating fluid is returned to a reservoir 20 via a return passage 19. The operating fluid is cooled by a heat dissipator 21. Although not shown, a pressure maintaining valve is provided in the return passage 19 so as to keep a pressure within the converter chamber 13d below a predetermined pressure level (a converter pressure Pc. In operation, the engine driven pump impeller 13a turns the operating fluid therein to cause it to impinge upon the turbine runner 13b and then to pass through the stator 13c. As a result, a torque multiplication is made in rotating the turbine runner 13b under the influence of reaction by the stator 13c. When it operates in this converter state, the torque converter can deliver a power of the engine 10 to the output shaft 14 with a slip (a relative rotation) between the input and output elements 13a and 13b while it functions as a vibration damper and a torque multipler. After being delivered through a change speed gearing (or a transmission) 42 where a gear ratio is changed, the power from the output shaft 14 is delivered to driving wheels of a vehicle to rotate them, thus enabling the vehicle to run.

The torque converter 13 is provided with a lock-up clutch 22 which is drivingly connected to the output shaft 14 via a torsional damper 23 and is axially movable with respect to the output shaft 14 to define a lock-up chamber 24. When, in operation, a lock-up pressure $P_{L/U}$ within the lock-up chamber 24 is discharged, the clutch 22 is urged to move to the left as viewed in FIG. 2 under the action of the converter pressure Pc within the converter chamber 13d until a drive connection between the input and output elements 13a and 13b is established so as to eliminate the slip in the torque converter 13.

The above mentioned lock-up pressure $P_{L/U}$ is controlled by a lock-up control valve 25 in a manner mentioned later. To this end, the lock-up chamber 24 is allowed to communicate with a port 25a of the lock-up control valve 25 via an axial bore of the output shaft 14 and a circuit 26. The lock-up control valve 25 has a port 25b supplied with the converter pressure Pc via a circuit 27, a drain port 25c and a spool 25d. When it is in a neutral position as illustrated in FIG. 2, the spool 25d disconnects the port 25a from both of the ports 25b and 25c. When it moves to the left from the illustrated position, the spool 25d allows the port 25a to communicate with the port 25b, whereas when it moves to the right from the illustrated position, the spool 25d allows the port 25a to communicate with the port 25c.

The spool 25d is movable in response to a force due to the converter pressure Pc within a chamber 25e acting upon a differential pressure acting area between lands which define the chamber 25e, a force due to the lock-up pressure $P_{L/U}$ within the chamber 25f acting upon a differential pressure acting area between lands which define the chamber 25f, and a force due to a control pressure Ps within a chamber 25g acting upon the left end thereof. The control pressure Ps is produced by a control pressure generator circuit 28 and a solenoid valve 29 in a manner as follows.

The control pressure generator circuit 28 has one end 28a supplied with a reference pressure (a line pressure in the case of an automatic transmission) $P_L$ and allows this line pressure $P_L$ to be drained from an opposite end 28c thereof via orifices 28c and 28d. The rate of drainage of fluid is determined by the solenoid valve 29 that is duty controlled so that the control pressure Ps is produced between the orifices 28c and 28d. This control pressure Ps is introduced into the chamber 25g.

Figure 3A:
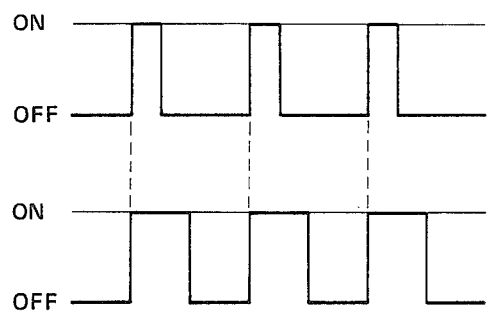
FIGS. 3A and 3B are time charts illustrating a variation in duty of an output signal generated by a computer.
Figure 3B:
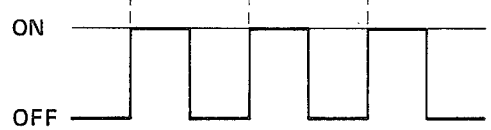
Figure 4:
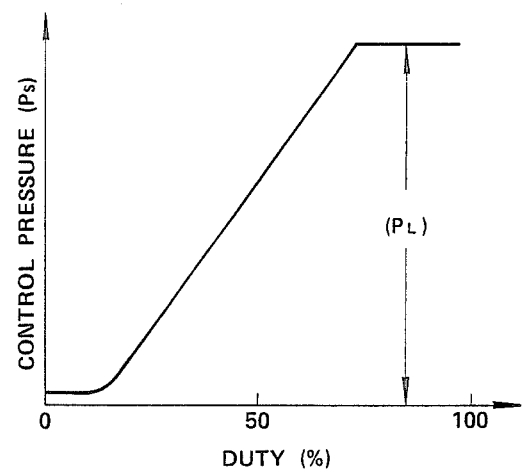
FIG. 4 is a control pressure vs. duty characteristic curve.

The solenoid valve 29 is provided with a plunger 29a and a solenoid 29b which urges it to move to the left as viewed in FIG. 2. When, in operation, the solenoid 29b is deenergized, the above mentioned drain is allowed to move because the plunger 29a is pressed away from the opposite end 28b by the draining fluid. When the solenoid 29b is energized, the plunger 29a is allowed to move to the left to close the drain open end 28b. Electric current passing through the solenoid 29b is duty controlled by a pulse train signal as shown in FIGS. 3A and 3B from a control computer 31 such that the current supply is permitted during a period of a pulse width of the pulse train signal. When the duty (%) is small as shown in FIG. 3A, a period during which the solenoid valve 29 closes the drain open end 28b per each cycle is relatively short and thus the control pressure Ps takes a certain constant as shown in FIG. 4 which is determined by a difference in size of the orifices 28c and 28d. As the duty (%) increases to an extent as shown in FIG. 3B, the period during which the solenoid valve 29 closes the drain open end 28b per each cycle increases. Thus, the control pressure Ps increases gradually as shown in FIG. 4 and then finally to a level as high as the line pressure $P_L$.

Figure 5A:
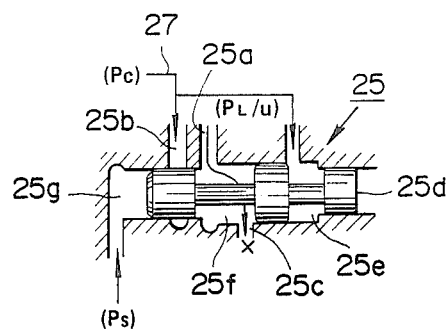
FIGS. 5A and 5B are diagrammatic views illustrating different states assumed by a clutch control valve.
Figure 5B:
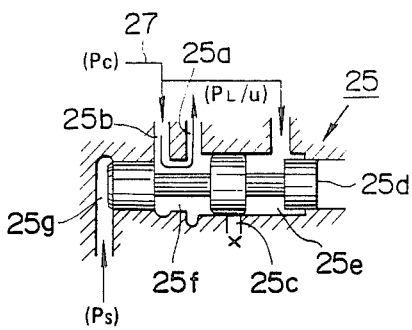
Figure 6:
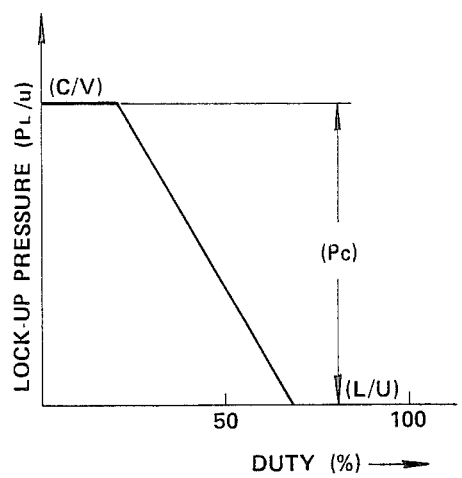
FIG. 6 is a lock-up pressure vs. duty characteristic curve.

Referring to FIG. 2, as the control pressure Ps rises, the spool 25d moves to the right as shown in FIG. 5A to gradually increase communication of the port 25a with the port 25c, thus causing a drop in the lock-up pressure $P_{L/U}$. On the other hand, as the control pressure Ps drops, the spool 25d moves to the left as shown in FIG. 5B to gradually increase communication of the port 25a with the part 25b, thus causing a rise in the lock-up pressure $P_{L/U}$. Since as shown in FIG. 4, there is a relationship that the control pressure Ps rises as the duty (%) increases, the lock-up pressure $P_{L/U}$ is kept at a level of the converter pressure Pc for a range where the duty (%) is small and it drops as the duty (%) increases and finally to zero as shown in FIG. 6. Therefore, when the lock-up pressure $P_{L/U}$ assumes its highest value which is equal to the converter pressure Pc, the lock-up clutch 22 is released or disengaged because the pressure within the chamber 24 is equal to the pressure within the chamber 13d, thus allowing the torque converter 13 to operate in the converter (C/V) state where the degree in slip is maximum. As the lock-up pressure $P_{L/U}$ drops, the lock-up clutch is gradually engaged and engagement force increases because a difference between the pressure within the chamber 13d and the pressure $P_{L/U}$ within the lock-up chamber 24 increases, resulting in a gradual decrease in the degree of slip. When the lock-up pressure $P_{L/U}$ assumes zero, the lock-up clutch 22 is completely engaged owing to the converter pressure Pc, thus allowing the torque converter 13 to operate in the lock-up state where there is no slip.

The control computer 31 is operable on an electric power source +V. Inputs to the computer 31 include an engine temperature indicative signal such as a coolant temperature signal $S_T$, an engine speed signal Sir from an engine speed sensor 33 which measures the number of revolutions of the input element 13a, a change speed gearing (csg) output shaft revolution speed signal Sor from an csg output revolution speed sensor 34, an engine throttle opening signal $S_{TH}$ from a throttle opening sensor 35, and a gear position (gear ratio) signal Sg from a gear position sensor 43. The revolution speed of the output element 13b can be given by multiplying the csg output shaft revolution speed signal Sor with the gear ratio of the change speed gearing 42. The gear position sensor 43 detects a gear ratio established in the change speed gearing 42.

Figure 7:
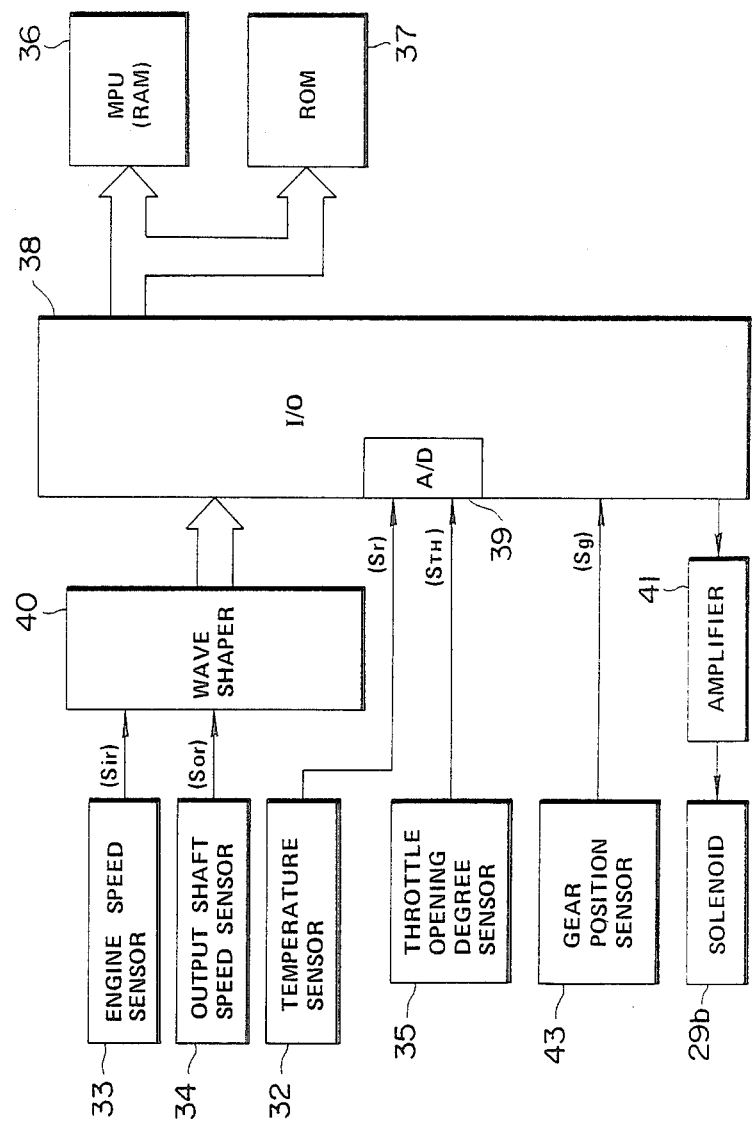
FIG. 7 is a block diagram of the computer.

Referring to FIG. 7, the computer 31 is further described in structure. The computer 31 is a microcomputer as shown in FIG. 7 which includes a microprocessor unit (MPU) 36 containing a random access memory (RAM), a read only memory (ROM) 37, and an input/output interface circuit (I/O) 38, and an analog/digital converter (A/D). The signals Sir, Sor from the sensors 33, 34, respectively, are shaped in a wave shaper 40 before being input to the I/O, the signals $S_T$, $S_{TH}$ from the sensors 32, 35 are converted to digital signals by the A/D converter 39 before being input to the I/O 38, and the signal Sg from the sensor 43 is directly input to the I/O 38. The MPU 36 performs operations on the data based on these input signals along with control programs stored in the ROM 37 and the duty control of the solenoid 29b of the solenoid valve 39 via an amplifier 41.

Figure 8:
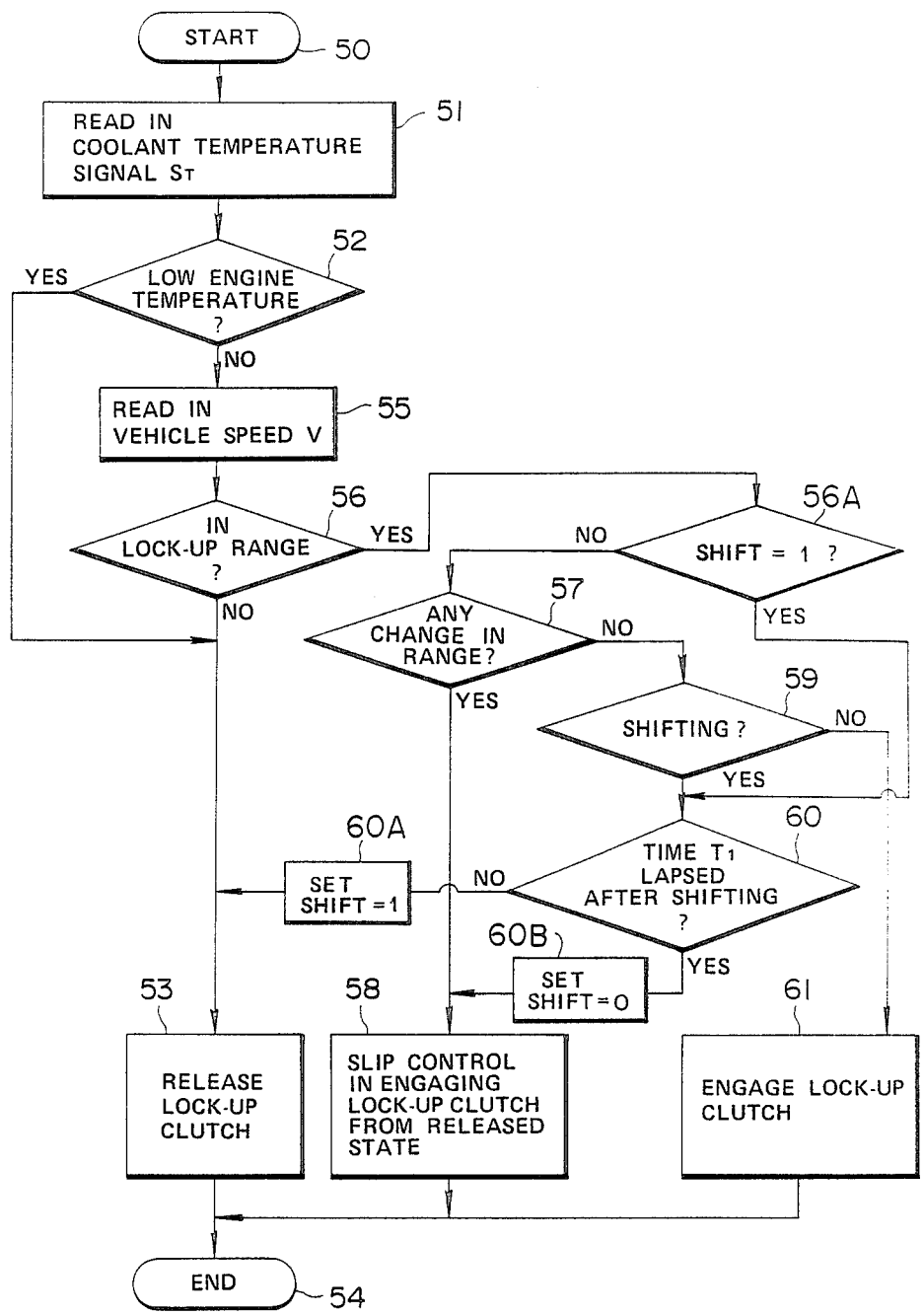
FIG. 8 is a flowchart of a lock-up control program.

FIGS. 8 and 9 show flowcharts of control programs for performing shockless lock-up control.

An interruption signal is produced each time after a predetermined time has lapsed and causes execution of a routine shown in FIG. 8. Referring to the flowchart shown in FIG. 8, the coolant temperature signal $S_T$ is read (in a step 51). In the subsequent step 52, a decision is made whether the engine temperature is low or not to find out whether or not the engine is warmed up. When the decision in the step 52 determines that the engine temperature is low and thus the operation of the engine 10 is not stable, the control goes to a step 53 where the lock-up clutch 22 is released and then a step 54 where this routine ends. What is done in the step 53 is to set the output duty at 0% (zero). This causes the lock-up clutch $P_{L/U}$ to assume the highest value which is as high as the converter pressure Pc as will be readily understood from FIG. 6, causing the lock-up clutch 22 to be released. Under this condition, the torque converter 13 operates in the converter (C/V) state where engine torque is multiplied and torque variation is absorbed thereby to secure stable operation of the engine 10.

Figures 12, 13:
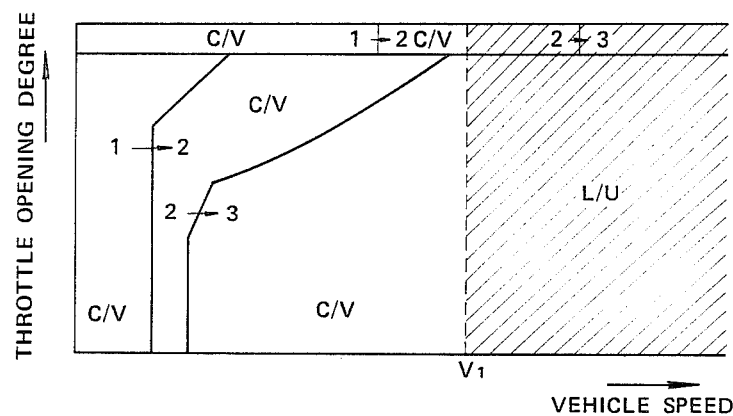
FIG. 12 shows a TABLE III for alpha.
FIG. 13 is a shift pattern diagram showing a lock-up range in terms of a throttle opening degree and a vehicle speed.

When the decision in the step 52 determines that the engine temperature, i.e., the coolant temperature, has risen and thus the engine 10 has completed its warming up operation, the control goes to a step 55 where a vehicle speed Vo is determined on the output shaft speed No of the change speed gearing 42 given by arithmetic operations on the change speed gearing (cgs) output shaft revolution speed signal Sor. In the subsequent step 56, a decision is made on the vehicle speed V whether or not the vehicle operates in the lock-up (L/U) range as shown by shadowed region in FIG. 13 based on the decision whether or not the vehicle speed V is higher than a lock-up vehicle speed value V1 (see FIG. 13). There is stored a map corresponding to a shift pattern diagram shown in FIG. 13 in the ROM 37. The above mentioned decision process on the vehicle speed V is executed using this map in the ROM 37. In FIG. 13, an abbreviation C/V designates a converter range wherein the torque converter 13 should operate in the converter state.

When the decision in the step 56 determines that the torque converter 13 should operate in the C/V range, the control goes to the step 53 where the lock-up clutch 22 is released, thus allowing the torque converter to operate in the converter state.

When the decision in the step 56 determines that the torque converter 13 should operate in the L/U range, the control goes via a step 56A to a step 57 where a decision is made whether or not there has occurred a change from C/V range to L/U range between the preceding routine and the present routine based on a decision whether or not there took place C/V range in the preceding routine. When the decision in the step 57 determines that a change has occurred to L/U range, the control goes to a step 58 where a control program which will be described later in connection with FIG. 9 is executed in order to control the engagement speed of the lock-up clutch 22 during shifting from the converter state to the lock-up state. When the decision in the step 57 determines otherwise, the step 57 selects a step 59 where a decision is made, on the gear position signal Sg from the sensor 57, whether or not there has been any change in the gear position signal Sg which indicates a gear shifting (for instance, a 2-3 shift in the kickdown range as shown in FIG. 13). For the appropriate shifting without substantial shocks, the torque converter 13 should assume the converter state for a duration beginning with an instant when a shift command occurs and ending with an instant when the shift is completed (a temporal lock-up release) even if the operation in L/U range is demanded, and the torque converter 13 should reassume the lock-up state from the converter state after completion of the shift. This desired control is carried out in a step 60 where a decision is made whether or not a predetermined time T1 has lapsed from the shift command instant and the control goes to a step 60A where a SHIFT flag is set at "1" and then the step 53 when the lock-up clutch 22 is released if the predetermined time T1 has not yet lapsed, meaning that the shifting is taking place. The control is such that the lock-up clutch 22 is kept released until the predetermined time T1 lapses, i.e., until the decision is made in the step 60 that the predetermined time T1 has lapsed. Upon lapse of the predetermined time T1, the control goes to a step 60B where the SHIFT flag is set at "0" and then to the step 58. It will be readily understood that when the SHIFT flag is set at "1", the step 56A allows a jump from the step 56 to the step 60 bypassing the steps 57 and 59.

When the decision in the step 59 determines that there has been no shifting in gear position, the control goes to a step 61 where the output duty is set at 100%. This causes the lock-up pressure $P_{L/U}$ to assume zero, thus keeping the lock-up clutch 22 to be engaged. Under this condition, an increase in fuel economy of the engine 10 can be accomplished because there is no slip in the torque converter 13.

Hereinafter, the slip control during a transition period from converter state to lock-up state is described along with flowchart shown in FIG. 9.

The engagement speed of the lock-up clutch 22 is adjusted by the control program as shown in FIG. 9 until the complete firm engagement is established. Referring to FIG. 9, a throttle opening degree $T_H$ is read from throttle opening degree signal $S_{TH}$ generated by sensor 35. In the subsequent step 72, an engine revolution speed $N_E$ is given by computation on the signal Sir generated by sensor 33, the engine revolution speed $N_E$ being equal to a revolution speed of the pump impeller 13a. In a step 73 which follows, a turbine runner revolution speed $N_T$ is given by multiplying a gear ratio i established in the change speed gearing 42 with an output shaft revolution speed $N_O$ of the gearing ($N_T = i \times N_O$). In the next step 74, a torque converter slip $\Delta N$ is given by subtracting $N_T$ from $N_E$ ($\Delta N = N_E - N_T$). In a step 75, a deviation in slip $\Delta X$ is given by subtracting a preset slip N2 (for example, 700 rpm) from $\Delta N$ ($\Delta X = \Delta N - N2$), where N2 is a critical value in slip in terms of a revolution speed at which a shift is to be made from feedback control to feedforward control.

Then, the control goes to a step 76 where a difference between the slip $\Delta N$ and another preset slip N1 which is set larger than the above mentioned present slip N2 is given by subtracting the preset slip N1 from the slip $\Delta N$, and a decision is made whether or not the difference thus given is greater than or equal to zero. When the slip $\Delta N$ is greater than or equal to the present slip $N_1(\Delta N - N1 \geq 0)$, a step 77 is executed. In this step, a proportional constant Ki for an integral control and a proportional constant Kp for a proportional control which are suitable for load on the engine 10 are selected. Since, in this example, PI control is used, Ki and Kp are selected. These constants Ki and Kp are given by table look-up of Tables shown respectively in FIGS. 10A and 10B. Table look-up is performed based on the throttle opening degree $T_H$ (or an engine induction vacuum) and the turbine revolution speed $N_T$ which represent load state of the engine 10. Since, with the same turbine revolution speed, the load increases as the throttle opening degree $T_H$ increases, and with the same throttle opening degree, it increases as the turbine revolution speed $N_T$ decreases, Ki and Kp take values which decrease as the throttle opening degree $T_H$ increases and decrease as the turbine revolution speed $N_T$ decreases in TABLES I as shown in FIG. 10A and 10B, thus causing a control gain determined by Ki and Kp to decrease as the load increases and increases as the load decreases so as to match the control characteristics shown in FIG. 1. The values set in these TABLES I are suitable for the lock-up control when the slip $\Delta N$ is greater than the preset value N1. Since in this range the engagement speed at which the lock-up clutch 22 is engaged may be increased for good response without producing substatial shocks during clutch engagement process, the values set in the TABLES I are large compared to those provided by the later described in TABLES II.

In the next step 78, the duty is given by PI (Proportional-Integral) computation based on proportional constants Ki and Kp which have been selected as mentioned above. That is, the constant Ki is multiplied with said deviation in slip $\Delta X$ to give a result, and then this result is added to a duty value D(OLD) set in the previous routine to give a duty value D(NEW), i.e., $D(NEW) = D(OLD) + Ki \cdot \Delta X$. This integral control portion D(NEW) is added to a proportional portion expressed by $Kp \cdot \Delta X$ to give a duty value D for the present routine, i.e., $D = D(NEW) + Kp \cdot \Delta X$. This duty value D signal is transmitted via the amplifier 41 (see FIG. 7) to the solenoid 29b.

Figure 1:
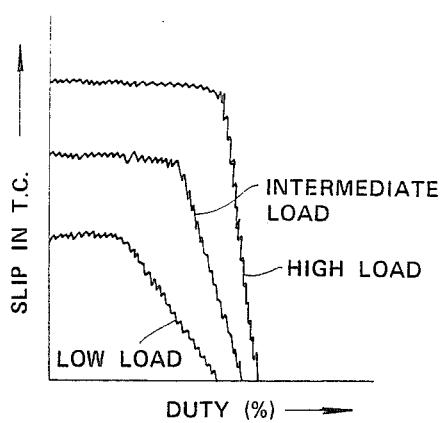
FIG. 1 shows slip vs. duty characteristic curves for different load conditions imposed on an engine.

When the decision in the step 76 determines that $\Delta N - N1$ is less than 0, i.e., $\Delta N$ is less than N1 ($\Delta N < N1$), a step 79 is executed. In the step 79, a decision is made whether or not a difference $\Delta N - N2$ of the slip $\Delta N$ from the before mentioned small preset value N2 is greater than or equal to 0 (zero). When $\Delta N$ is greater than or equal to N2 ($N1 > \Delta N \geq N2$), a step 80 is selected where the proportional constants Ki and Kp are selected by table look-up of TABLES II (stored in the ROM 37) as shown in FIGS. 11A and 11B based on throttle opening degree $T_H$ and turbine revolution speed $N_T$. Similarly to TABLES I, the TABLES II provide values as Ki and Kp which decrease as the throttle opening degree $T_H$ increases and decrease as the turbine revolution speed $N_T$ decreases, thus causing the control gain determined by Ki and Kp to decrease as the load increase and increases as the load decreases so as to match the control characteristics as shown in FIG. 1. However, the values for Ki and Kp provided by the TABLES II are relatively small because they are for lock-up control to be carried out when the slip $\Delta N$ falls in a range expressed by $N1 > \Delta N \geq N2$ where the lock-up clutch will engage with substantial shocks if the engagement speed of the lock-up clutch is high.

After obtaining Ki and $k_p$, the control goes to the step 78 where the before mentioned PI computation is performed based on Ki and Kp and the computation result is generated via the amplifier 41 (see FIG. 7) to the solenoid 29b.

The above mentioned lock-up control process is a feedback control which is repeatedly carried out until the slip $\Delta N$ drops down to the relatively small preset value N2. In the process, the output duty is increased by an amount that is variable with the slip deviation $\Delta X$ and proportional to constants Ki and Kp, causing the lock-up pressure $P_{L/U}$ to drop after completion of each control routine in a manner as shown in FIG. 6. Therefore, the slip $\Delta N$ in the torque converter 13 drops sequentially until it is brought down to the preset value N2.

After it is brought down in the above mentioned manner and when the slip $\Delta N$ becomes below the preset valve N2, i.e., $\Delta N - N2 < 0$ or $\Delta N < N2$, the step 79 prohibits the feedback control and permits switching to feedforward control by selecting steps 81 and 82 sequentially. In the step 81, a duty increase $\alpha$ (alpha) corresponding to load state is selected by table look-up of TABLE III, as shown in FIG. 12, stored in the ROM 37 based on throttle opening degree $T_H$ and turbine revolution speed $N_T$.

Values for this duty increase $\alpha$ (alpha) provided by the TABLE III decreases as throttle opening degree $T_H$ increases and decreases as turbine revolution speed $N_T$ decreases similarly to TABLES I and II, thus causing the control constant which is determined by the duty increase $\alpha$ (alpha) itself to decrease as the load increase and increase as the load increases, thus matching the control characteristics shown in FIG. 1. Small values are set for the duty increase $\alpha$ (alpha) in the TABLE III so that the substantial shocks will not be produced while the slip $\Delta N$ decreases from the present value N2 to 0 (zero) because this control is to be carried out when the slip $\Delta N$ is very small which occurs immediately before the lock-up of the torque converter.

In the subsequent step 82, the duty increase $\alpha$ (alpha) is added to the duty value D(OLD) obtained in the previous routine to give a duty D for the present routine. This result is generated via the amplifier 41 to the solenoid 29b. During this feedforward control, the output duty is increased by the duty increase $\alpha$ (alpha) after execution of each routine, thus causing the lock-up pressure $P_{L/U}$ to drop in the manner as illustrated in FIG. 6. Therefore, the slip $\Delta N$ in the torque converter 13 is decreased from the preset value N2 down to zero when the lock-up state is established.

From the preceding description it will now be understood that since in the previously described embodiment the control constants (Ki, Kp, $\alpha$) are varied in correspondance with varying load on the engine, the engagement of the lock-up clutch is controlled in accordance with engine load, thus providing the optimal lock-up control for any given load state.

Hereinafter, a second embodiment according to the present invention is described referring to FIGS. 1 to 7, and 14 to 16.

Figure 14:
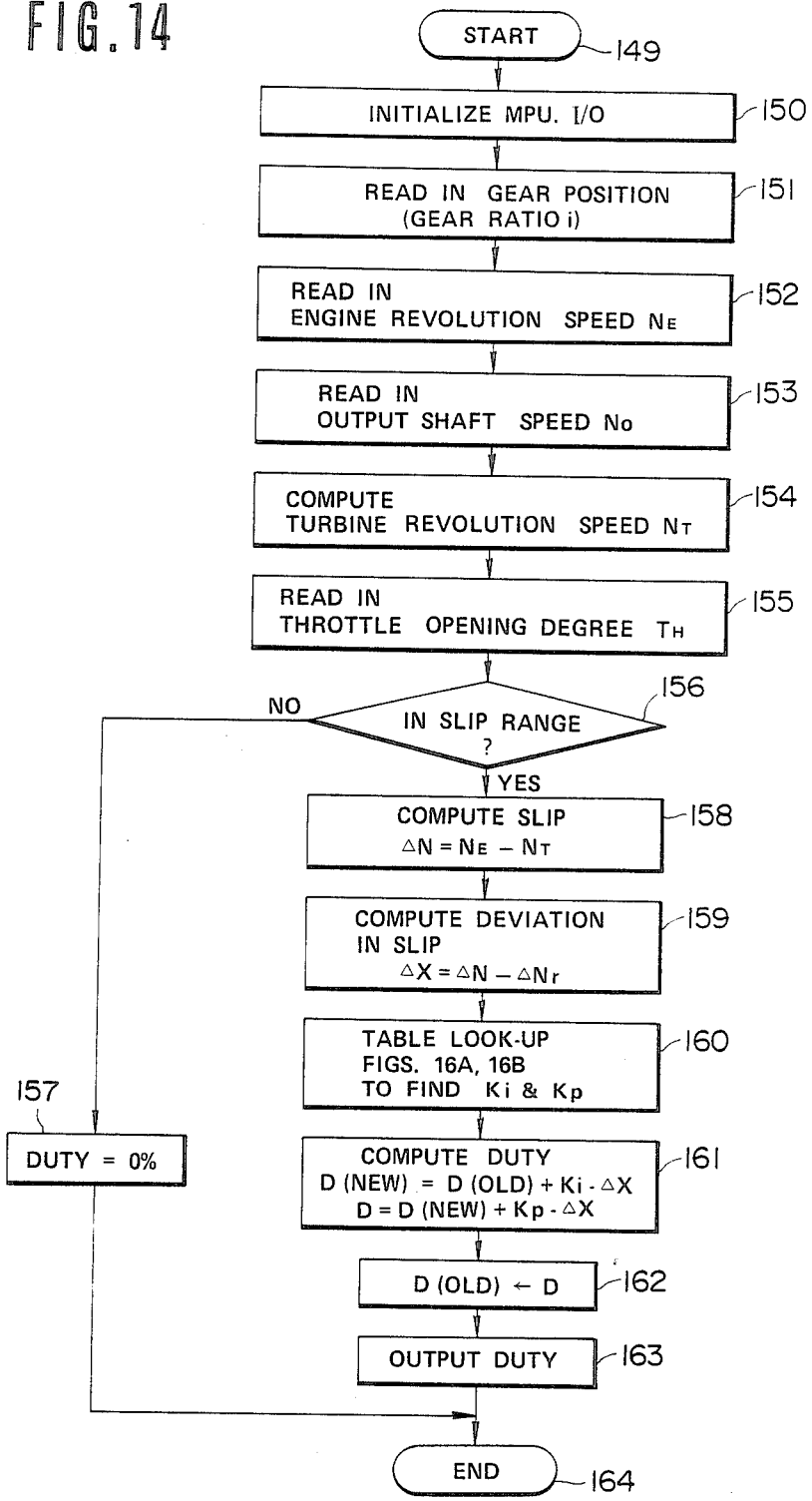
FIG. 14 is a flowchart of a slip control program.

This second embodiment is different from the first embodiment in that what is stored in a ROM 37 (see FIG. 7) is a slip control program as shown in FIG. 14 and an engine temperature signal Sr generated by a temperature sensor 32 is not needed (see FIGS. 2 and 7).

Referring now to FIG. 14, there is shown an interrupt program stored in ROM 37 (see FIG. 7). In a step 149, entry of an interruption occurring after lapse of a predetermined time into a MPU 36 (see FIG. 7) causes it to start execution of this program. First of all, in a step 150, MPU 36 and I/O 38 are initialized. In the subsequent step 151, a gear position (a gear ratio i) is read from a signal Sg generated by a gear position sensor 43. In the next step 152, an engine revolution speed (corresponding to pump impeller revolution speed) $N_E$ is read from a signal Sir generated by an engine speed sensor 33. In a step 153, an output shaft revolution speed $N_O$ of a change speed gearing 42 is read from a signal Sor generated by an output shaft speed sensor 34. In a step 154, the output shaft revolution speed $N_O$ is multiplied with the gear ratio i ($N_O \times i$) to give a turbine runner revolution speed $N_T$. In the next step 155, a throttle opening degree $T_H$ is read from a signal $S_{TH}$ generated by a throttle opening degree sensor 35.

Thereafter, the control goes to a step 156 where a decision is made based on the throttle opening degree $T_H$ and the output shaft revolution speed $N_O$ (vehicle speed) whether or not a slip control of a torque converter 13 is required. When the decision determines that the torque converter is required to operate in converter state, the control goes to a step 157 where duty is set at 0%, thus permitting the torque converter 13 to operate in the converter state.

Figures 15A, 15B, 16:
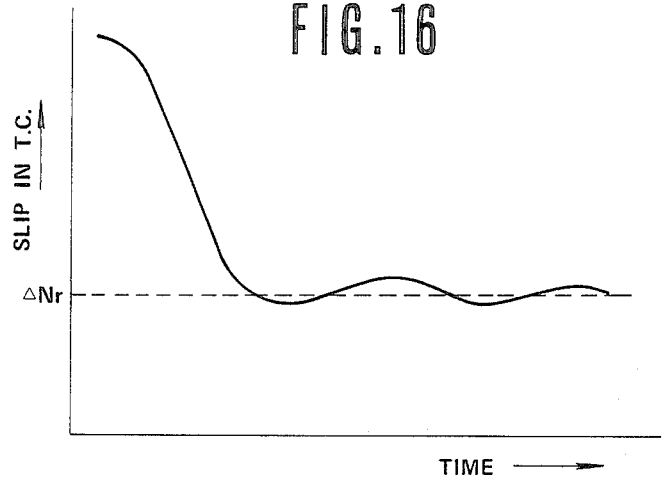
FIGS. 15A and 15B show a TABLE VI for Ki and a TABLE IV for Kp, respectively.
FIG. 16 is a time chart showing how a slip is reduced according to the present invention.

When the decision in the step 156 determines that the torque converter 13 should operate in the slip range, the control goes to a step 158 where a slip $\Delta N$ is given by computing an equation $\Delta N = N_E - N_T$. In the next step 159, a deviation $\Delta X$ of the slip $\Delta N$ from a preset slip value $\Delta Nr$ is given by computing an equation $\Delta X = \Delta N - \Delta Nr$ and in a step 160, a proportional constant Ki for integral control and a proportional constant Kp for proportional control are given by table look-up of TABLES IV, stored in the ROM, as shown in FIGS. 15A and 15B based on throttle opening degree $T_H$ and turbine revolution speed $N_T$.

In these TABLES IV, Ki and Kp take values which decrease as the throttle opening degree $T_H$ increases and decrease as the turbine revolution speed $N_T$ decreases so as to cause a control gain determined by Ki and Kp to decrease as the engine load increases and increase as the engine load decreases in such a manner as to match the control characteristics as shown in FIG. 1. The trend of variation of values in the TABLES IV therefore is similar to TABLES I and II.

In the sebsequent step 161, duty is given by computation on the proportional constants Ki and Kp. That is, a duty value D(NEW) by integral control is given by computing an equation $D(NEW) = D(OLD) + Ki \cdot \Delta X$, where D(OLD) is a duty value obtained in the previous routine, and then a duty value D for the present routine is given by computing an equation $D = D(NEW) + Kp \cdot \Delta X$. In the next step 162, the duty value D(OLD) for the previous routine is replaced with the duty value D (NEW) resulting from the computation in the step 161 and the duty value D stored as D(OLD) is generated via an amplifier 41 (see FIG. 7) to a solenoid 29b. One routine ends when the control arrives at a step 164 from the step 157 or the step 163.

It will now be understood that since in the second embodiment the duty is increased by an amount that is variable with the slip deviation $\Delta X$ and proportional to constants Ki and Kp, a lock-up pressure $P_{L/U}$ decreases in a manner illustrated in FIG. 6 until the slip $\alpha N$ becomes equal to the preset slip $\Delta Nr$. Since in the step 160 the proportion constants Ki and Kp are given values suitable for the engine load, the optimum slip control as shown in FIG. 16 is assured in every engine load state.

What is claimed is:

1. A control system for a lock-up clutch in a torque converter including an input element driven by a power source and an output element hydraulically connected to the input element, the lock-up clutch being shiftable from a released position thereof to an engaged position thereof wherein mechanical driving connection between the input and output elements is established, the control system comprising:
    means for detecting the operating load on the power source and generating a load indicative signal; and
    means for controlling the lock-up clutch engagement speed in response to said load indicative signal.

2. A control system as claimed in claim 1, wherein said controlling means adjusts the engagement speed of the lock-up clutch in accordance with a control gain, and alters said control gain in response to said load indicative signal.

3. A control system as claimed in claim 2, wherein said detecting means determines the operating load on the power source based on a throttle opening degree of the power source and a revolution speed of the output element of the torque converter.

4. A control system as claimed in claim 1, wherein said controlling means adjusts engagement degree of the lock-up clutch in accordance with a control gain, and alters said control gain in response to said load indicative signal.

5. A control system as claimed in claim 4, wherein said detecting means determines the operating load on the power source based on a throttle opening degree of the power source and a revolution speed of the output element of the torque converter.

6. A control system for controlling a torque converter having an input element driven by a power source and an output element, the torque converter including a lock-up clutch, the lock-up clutch being shiftable from a released position thereof to an engaged position thereof wherein mechanical driving connection between the input and output elements of the torque converter is established, the control system comprising:

means for detecting the operating load on the power source and generating a load indicative signal;

means for hydraulically controlling engagement of the lock-up clutch in accordance with an electric control signal supplied thereto; and means for modifying said electric control signal in accordance with a control gain and varying said control gain with said load indicative signal.

7. A control system for controlling a torque converter having an input element driven by a power source and an output element, the torque converter including a lock-up clutch, the lock-up clutch being shiftable from a released position thereof to an engaged position thereof wherein mechanical driving connection between the input and output elements of the torque converter is established, the control system comprising:

means for detecting the operating load on the power source and generating a load indicative signal;

means for hydraulically controlling engagement of the lock-up clutch in accordance with an electric control signal supplied thereto; and means for modifying said electric control signal such that varied in response to said load indicative signal.

8. A control system for controlling a torque converter having an input element driven by a power source and an output element, the torque converter including a lock-up clutch, the lock-up clutch being shiftable from a released position thereof to an engaged position thereof wherein mechanical driving connection between the input and output elements of the torque converter is established, the control system comprising:

means for detecting the operating load on the power source and generating a load indicative signal;

means for hydraulically controlling engagement of the lock-up clutch in accordance with an electric control signal supplied thereto; and means for modifying said electric control signal in accordance with a control gain and varying said control gain in response to said load indicative signal such that the force with which the lock-up clutch is moved toward a predetermined degree of slidable engagement varies with said load indicative signal.

* * * * *